US012486984B2

(12) United States Patent
Kannan et al.

(10) Patent No.: US 12,486,984 B2
(45) Date of Patent: Dec. 2, 2025

(54) CONTROLLED GAP FUEL NOZZLE HEAT SHIELD

(71) Applicant: PRATT & WHITNEY CANADA CORP., Longueuil (CA)

(72) Inventors: Jayaprakash Kannan, North York (CA); Sri Sreekanth, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/661,107

(22) Filed: May 10, 2024

(65) Prior Publication Data

US 2025/0347412 A1 Nov. 13, 2025

(51) Int. Cl.
*F23R 3/28* (2006.01)

(52) U.S. Cl.
CPC ................... *F23R 3/283* (2013.01)

(58) Field of Classification Search
CPC .. F23R 3/283; F23R 3/28; F23R 3/286; F02C 7/24; F23D 2211/00
See application file for complete search history.

(56) References Cited

U.S. PATENT DOCUMENTS

| | | | | |
|---|---|---|---|---|
| 4,938,418 A * | 7/1990 | Halvorsen | | F23N 1/007 239/584 |
| 5,598,696 A * | 2/1997 | Stotts | | F23R 3/283 60/800 |
| 6,321,541 B1 * | 11/2001 | Wrubel | | F23R 3/34 60/740 |
| 6,547,163 B1 | 4/2003 | Mansour et al. | | |
| 7,658,074 B2 * | 2/2010 | Tuttle | | F23R 3/28 60/737 |
| 7,832,377 B2 | 11/2010 | Lee et al. | | |
| 8,015,815 B2 * | 9/2011 | Pelletier | | F23R 3/14 60/742 |
| 8,015,816 B2 | 9/2011 | Hall | | |
| 8,695,349 B2 * | 4/2014 | Toon | | F23R 3/283 60/740 |
| 10,196,983 B2 | 2/2019 | Cadman et al. | | |
| 10,488,047 B2 | 11/2019 | Ott et al. | | |
| 10,648,671 B2 | 5/2020 | Kobayashi et al. | | |
| 11,085,633 B2 | 8/2021 | Glover | | |
| 11,143,406 B2 * | 10/2021 | Prociw | | F23R 3/60 |
| 2004/0129001 A1 * | 7/2004 | Lehtinen | | F23D 11/107 60/740 |
| 2010/0071666 A1 * | 3/2010 | Lee | | F23R 3/283 123/470 |

(Continued)

FOREIGN PATENT DOCUMENTS

| EP | 1108958 A1 * | 6/2001 | ............. | B05B 15/65 |
|---|---|---|---|---|
| GB | 2470742 A * | 12/2010 | ............. | F23R 3/425 |

OTHER PUBLICATIONS

Extended European Search Report for European patent application No. 25175819.9 dated Aug. 20, 2025, 8 pages,.

*Primary Examiner* — Craig Kim

(74) *Attorney, Agent, or Firm* — Kinney & Lange, P.A.

(57) ABSTRACT

An injector includes a mount, a stem, a nozzle, and a heat shield. The heat shield extends from the mount to surround the stem and at least a portion of the nozzle. The nozzle includes an exterior annular body. The distal end of the heat shield is spaced from a lip extending from the exterior annular body or a cap surrounding the nozzle to form an axial gap.

18 Claims, 3 Drawing Sheets

(56) References Cited

U.S. PATENT DOCUMENTS

| | | | |
|---|---|---|---|
| 2010/0096037 A1* | 4/2010 | Lee | F23D 14/78 |
| | | | 285/123.1 |
| 2011/0271681 A1 | 11/2011 | Bagchi et al. | |
| 2012/0292408 A1* | 11/2012 | Short | F23D 11/103 |
| | | | 239/463 |
| 2013/0047620 A1 | 2/2013 | Mao et al. | |
| 2015/0253009 A1* | 9/2015 | Bandaru | F23R 3/28 |
| | | | 60/740 |
| 2016/0116168 A1* | 4/2016 | Bandaru | F23R 3/28 |
| | | | 60/39.48 |
| 2016/0348913 A1* | 12/2016 | Ott | F02C 7/222 |
| 2017/0122212 A1* | 5/2017 | Cadman | F02C 7/222 |
| 2020/0217509 A1 | 7/2020 | Lakshmanan et al. | |
| 2024/0344702 A1* | 10/2024 | Boardman | F23R 3/34 |

* cited by examiner

CONTROLLED GAP FUEL NOZZLE HEAT SHIELD

BACKGROUND

The present disclosure relates generally to fuel injectors of gas turbine engines, and more particularly, thermal protection for fuel injectors.

Fuel injectors are exposed to high temperature gas during operation of gas turbine engines. Heat shields provide thermal protection by surrounding a portion of the fuel injector. Due to differential thermal growth between the heat shield and fuel injector, conventional heat shields often form a gap that permits ingress of high temperature gases between the heat shield and fuel injector and decreases the effectiveness of the thermal protection. Further development of heat shield design is desirable to improve thermal protection of the fuel injector that accommodates differential thermal growth.

SUMMARY

An injector according to an example embodiment of this disclosure includes a mount, a stem, a nozzle, and a heat shield. The heat shield extends from the mount to surround the stem and at least a portion of the nozzle. The nozzle includes an exterior annular body and a lip extending outward from the exterior annular body. The distal end of the heat shield is spaced from the lip to form an axial gap that is configured to decrease in a hot condition relative to a cold condition operatively associated with the injector.

An injector according to another example embodiment of this disclosure includes a mount, a stem, a nozzle, a cap, and a heat shield. The heat shield extends from the mount to surround the stem and at least a portion of the nozzle. The nozzle includes an exterior annular body. A cap surrounds the nozzle and extends towards the heat shield. The distal end of the heat shield is spaced from an inlet end of the cap to form an axial gap that is configured to decrease in a hot condition relative to a cold condition operatively associated with the injector.

DETAILED DESCRIPTION

Figure 1:
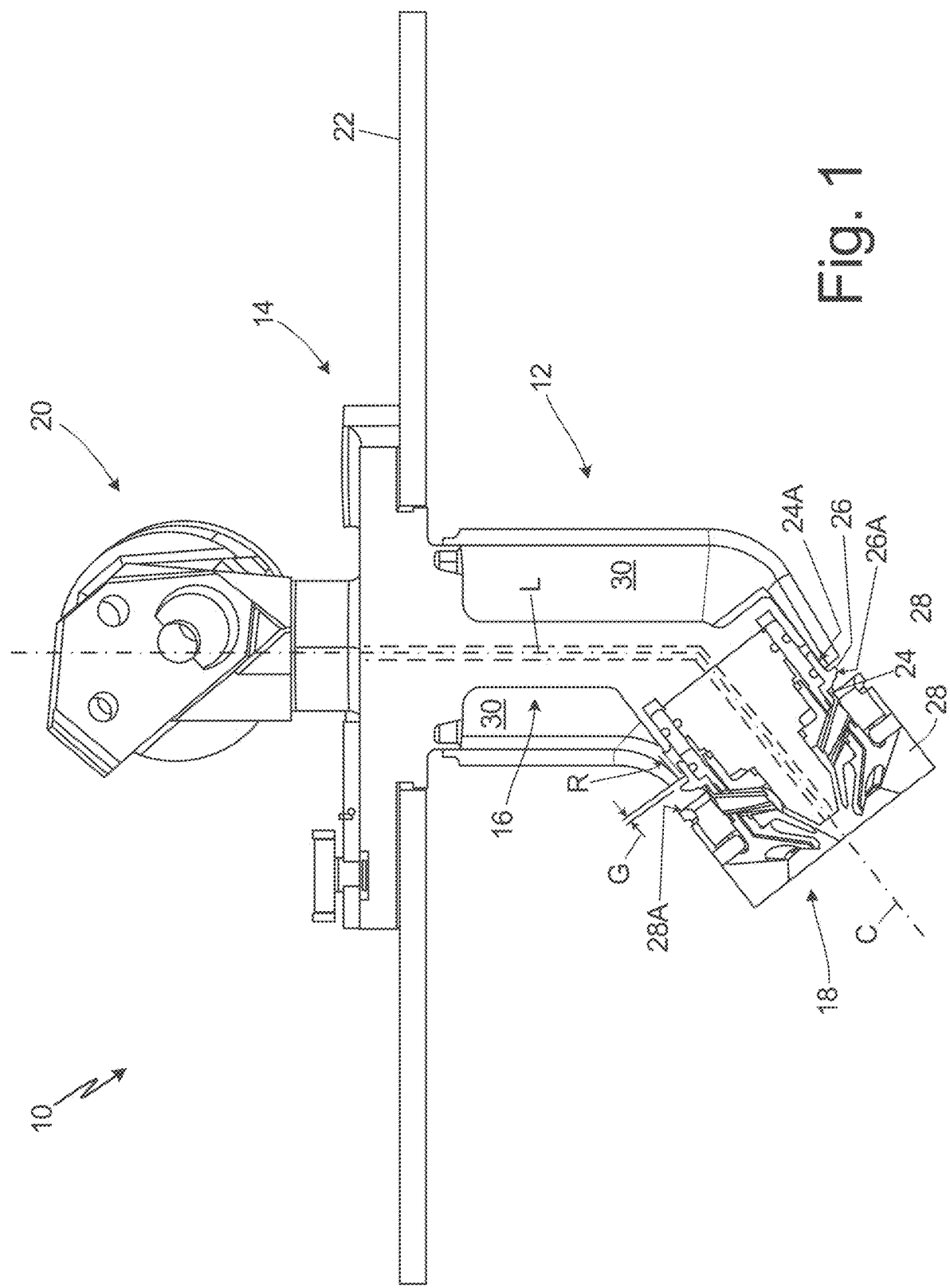
FIG. 1 is a cross-sectional view of an injector that includes a heat shield forming an axial gap with the nozzle.

FIG. 1 is a cross-sectional view of injector 10 that includes heat shield 12. Heat shield 12 surrounds at least as portion of injector 10 to define axial gap G and radial gap R between a distal end of heat shield 12 and nozzle 18. In operation, differential displacement of heat shield 12 relative to stem 16 and nozzle 18 of injector 10 cause axial gap G to decrease, reducing or closing axial gap G. Axial gap G reduction reduces or eliminates high temperature gas flow into a chamber between heat shield 12 and injector 10 relative to configurations that produce an increasing gap during operation.

While a particular injector 10 is depicted by FIG. 1, it shall be understood that heat shield 12, as described below, can be incorporated into other examples of injector 10, or other components exposed to high temperature gas or fluid. Injector 10 can include a single fuel path and a signal air path in some examples. Other examples of injector 10 can include multiple fuel paths connected to a single fuel source, or multiple fuel passages connected to multiple fuel sources. Fuel sources can include carbon-based fuel, other liquid or gaseous fuel, and/or multi-phase fuel (e.g., fuel in a liquid and gaseous phases). In some examples, injector 10 can receive a carbon-based liquid fuel and a multi-phase fuel (e.g., liquid hydrogen). Injector 10 can include additional air paths directed towards and/or between two or more fuel paths.

As described herein, heat shield 12 thermally protects injector 10 from high-temperature gas flow within the combustion chamber. Protected regions of injector 10 can experience reduced coking within fuel passages, in the case of carbon-based fuels, and/or protect against auto-ignition of fuel, in the case of hydrogen fuel, among other possible fuels for example.

As depicted, injector 10 includes heat shield 12, mount 14, stem 16, nozzle 18, and manifold 20. Injector 10 is a fuel delivery device installed within a combustor of a gas turbine engine. In operation, injector 10 delivers fuel and oxidant (e.g., air) at specified mass flow rates to provide an oxidant-fuel mixture within the combustor combustion chamber. While the following example describes heat shield 12 as forming axial gap G and radial gap R relative to nozzle 18 of injector 10, it will be understood that heat shield 12 can be configured to interface with a different portion of nozzle 18, or a different component of injector 10 in other examples.

Mount 14 supports injector 10 from stationary structure 22 of the gas turbine engine. One or more flanges, lips, and/or pilot diameters allow mount 14 to interface with stationary structure 22. Mount 14 further includes one or more fasteners, keys, and/or pins for affixing injector 10 relative to stationary structure 22 and the combustor of gas turbine engine. As depicted, mount 14 is a flange that abuts stationary structure 22, which can be a casing of gas turbine engine that surrounds the combustor. Mount 14 further includes a pilot diameter received within an opening of stationary structure 22 and may include fasteners (not shown) for affixing mount 14 to stationary structure 22.

Manifold 20 is outboard of mount 14 and includes supply lines fluidly communicating with a fuel source and/or one or more other adjacent injectors 10. Manifold can include one or more pipes, conduits, hoses, and/or internal passages to define supply lines, which communicate with one or more fuel passages of stem 16.

Stem 16 extends longitudinally from mount 14 through stationary structure 22 into combustion chamber of the combustor. Stem 16 includes one or more fuel passages in fluid communication with one or more supply passages of manifold 20. Stem 16 can extend linearly from mount 14 such that stem 16 is devoid of bends or elbows. In other examples, stem 16 can include one or more linear sections connected by respective bends such that a longitudinal axis of stem 16 represented by dashed line L changes at each bend relative to an adjacent linear section of stem 16. As depicted, stem 16 extends radially inward from mount 14 relative to an axis of gas turbine engine. Stem 16 includes a bend spaced apart from mount and extends at an angle relative to the radial section of stem 16 to nozzle 18.

Nozzle 18 is disposed at a distal end of stem 16 within the combustion chamber and extends along axis C parallel to a distal portion of stem 16. Nozzle 18 includes a centerbody and one or more annular bodies concentrically disposed with respect to the centerbody to form one or more discharge fuel passages configured to direct fuel along axis C. Each of the one or more discharge fuel passages fluidly connects to at least one of the fuel passages of the stem 16 to define respective fuel paths between manifold 20 and nozzle 18. Further, annular bodies of nozzle 18 form at least one gaseous passage for directing oxidant through nozzle 18 to mix with fuel discharged through fuel paths of injector 10.

Nozzle 18 includes exterior annular body 24. Exterior annular body 24 is radially inboard of a distal end of heat shield 12 relative to axis C and forms axial gap G and radial gap R. In some examples, exterior annular body 24 is the outermost annular body of nozzle 18 relative to axis C. In other examples such as the example depicted by FIG. 1, nozzle 18 includes one or more bodies outboard of exterior annular body 24 such as cap 28. Cap 28 and exterior annular body 24 can form one or more oxidant passages extending through nozzle 18. As shown by FIG. 1, cap 28 includes inlet end 28A adjacent to heat shield 12 that cooperates with lip 26 to form an entrance to the one or more oxidant passages, which is not obstructed by heat shield 12.

Exterior annular body 24 includes lip 26, which extends outward from exterior annular body 24. Lip 26 radially coincides with the distal end of heat shield 12 to form axial gap G. Peripheral surface 24A of exterior annular body 24 is spaced apart from heat shield 12 to form radial gap R and forms an exterior surface of nozzle 18. Lip 26 can extend in a radial direction relative to axis C such that flanks of lip 26 are normal to axis C. In other examples, lip 26 can extend radially and axially relative to axis C and have flanks oblique to axis C. As shown, lip 26 is disposed between heat shield 12 and cap 28 and includes chamfer 26A to improve oxidant flow into one or more oxidant passages of nozzle 18.

Heat shield 12 extends from mount 14 along longitudinal axis L to surround stem 16 and at least a portion of nozzle 18. In some examples, heat shield 12 can surround an entirety of stem 16 and nozzle 18. Heat shield 12 is spaced from stem 16 and nozzle 18 to form chamber 30. Stagnant gas (e.g., air) within chamber 30 provides thermal protection for stem 16 and nozzle 18. A proximal end of heat shield 12 affixes to mount 14 and can be concentric with mount 14 and/or stem 16 at the proximal end. Heat shield 12 extends along longitudinal axis L towards nozzle 18 and can include contours and/or bends that conform a shape of heat shield 12 to at least some portions of stem 16 and/or 18. Heat shield 12 cantilevers from mount 14 to distal end 12A, which is unsupported by nozzle 18 and stem 16, or any other portion of injector 10. Distal end 12A forms axial gap G and radial gap R with lip 26 and peripheral surface 24A of exterior annular body 24, respectively.

Heat shield 12, mount 14, stem 16, nozzle 18, and manifold 20 can be an assembly of components joined at respective interfaces to form injector 10. In some examples, components of injector 10 are joined using a brazing process and/or a welding process. In other examples, heat shield 12, mount 14, stem 16, nozzle 18, and manifold 20 describe regions of a monolithic body formed by, for example, an additive manufacturing process. Further, certain features of injector 10 can be formed by a machining process or other subtractive manufacturing.

Figure 2:
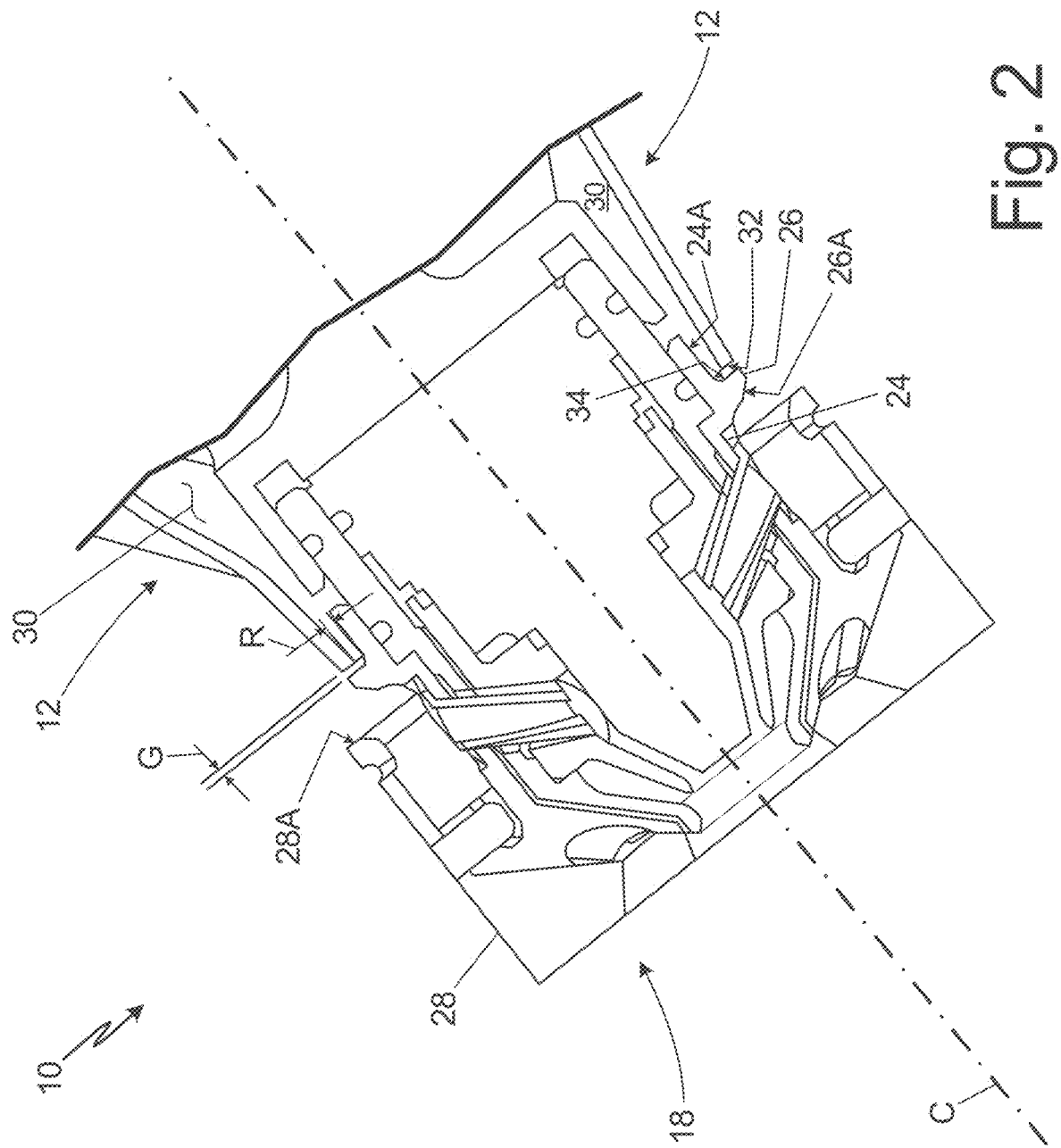
FIG. 2 is an enlarged cross-sectional view of the nozzle depicting additional details of the nozzle, the stem, and the heat shield.

FIG. 2 is a partial cross-sectional view of nozzle 18 that depicts features of heat shield 12 and nozzle 18 in greater detail. Stem 16, nozzle 18, heat shield 12, axial gap G, and radial gap R are shown. Distal end 12A of heat shield 12 and nozzle 18 extend along axis C. Distal end 12A of heat shield 12 is spaced axially from lip 26 and radially from peripheral surface 24A to form axial gap G and radial gap R, respectively.

Relative displacement of heat shield 12 and nozzle 18 can be described relative to axis C. Differential axial growth describes relative displacement between heat shield 12 and nozzle 18 parallel to axis C. Differential radial growth describes relative displacement between heat shield 12 and nozzle 18 perpendicular to axis C.

Heat shield 12 includes end face 32 at distal end 12A. In the depicted example, end face 32 is normal to axis C. In other examples, end face 32 can define a frustoconical surface circumscribing axis C such that end face 32 is oblique to axis C when viewed in a cross-sectional view such as FIG. 2. In other examples, end face 32 can have a profile that includes linear, convex, and/or concave portions as viewed in FIG. 2.

Lip 26 includes mating surface 34, which opposes end face 32 of heat shield 12. Mating surface 34 has a complimentary shape to end face 32 and has an orientation with respect to axis C that is complimentary to an orientation of end face 32. As depicted, mating surface 34 is normal to axis C and parallel to end face 32. However, in other examples, mating surface 34 can be oblique to axis C with a complementary orientation to end face 32 when viewed in a cross-sectional view. Further, some examples of mating surface 34 include a profile composed of linear, convex, and/or concave segments that is complimentary to a profile of end face 32.

Axial gap G is the linear distance measured parallel to axis C between opposing points on mating surface 34 of lip 26 and end face of heat shield 12. Radial gap R is the linear distance measured perpendicular to axis C between exterior and an innermost post of the end face 32.

Magnitudes of axial gap G and radial gap R are selected based on differential displacement between heat shield 12 and nozzle 18 expressed by injector 10 during one or more hot conditions (i.e., during operation of gas turbine engine) relative to a nominal or cold condition. Conditions contributing to differential displacement include the temperature of gas surrounding injector 10, the temperature of gas flowing through oxidant passages of injector 10, and the temperature of fuel flowing through injector 10. Further, coefficients of thermal expansion of nozzle 18, heat shield 12, stem 16 and to a lesser degree, mount 14 and manifold 20 contribute to differential displacement between heat shield 12 and nozzle 18. Mechanical loads on injector 10 may also contribute to differential displacement at axial gap G and radial gap R.

Injector 10 is operationally associated with a cold condition and one or more hot conditions. In a cold condition, combustion is not present within combustor and component of gas turbine engine are in equilibrium with an ambient environment. Furthermore, oxidant and fuel are not flowing through injector 10 in the cold condition. In each hot condition, combustion is present within combustion, exposing injector 10 to elevated temperatures and pressures associated with combustion while injector 10 delivers fuel and oxidant to combustor to sustain combustion. Hot conditions can be associated with different operating conditions (i.e., power levels) of gas turbine engine.

Axial gap G has a magnitude equal to or greater than a calculated differential displacement of heat shield 12 relative to stem 16 and nozzle 18, which can be calculated for a limiting operational condition of gas turbine engine, or for multiple operating conditions representing an operational range of gas turbine engine. In some examples, axial gap G is equal to or greater than threshold axial gap G. The threshold axial gap G exceeds the calculated differential displacement of heat shield 12 relative to stem 16 and nozzle 18 by a predetermined amount such that axial gap G is non-zero at the limiting operational condition of gas turbine engine. In some examples, axial gap G in a cold condition can be equal to or less than 508 microns (i.e., about 0.020 inches). In other examples, axial gap G in a cold condition can be equal to or less than 254 microns (i.e., about 0.010 inches). In other examples, axial gap G could have a different magnitude. Axial gap G in the hot condition can be zero in certain examples so long as heat shield 12 does not impose significant mechanical loads into nozzle 18. However, in other examples, axial gap G is non-zero in the hot condition such that a minimal axial gap G can be maintained in a limiting operational condition of the engine. In some examples, axial gap G can be at least 127 microns (i.e., about 0.005 inches). In each case, axial gap G is reduced in the hot condition relative to the cold condition such that high temperature gas is discouraged from entering chamber 30.

Radial gap R has a magnitude selected to maintain a minimum radial gap between heat shield 12 and exterior peripheral surface 24A throughout an entire operational range of gas turbine engine. Proximate distal end 12A of heat shield 12, radial gap R can be minimized in order to further discourage ingestion of high temperature gas into chamber 30. At locations spaced apart from distal end 12A, a radial distance between heat shield 12 and stem 16 can increase such as shown in FIG. 1.

In operation, exposure of high temperature combustion gas to injector 10 increases body temperatures of heat shield 12, exposed portions of nozzle 18, if any, and to a lesser degree stem 16, mount 14, and manifold 20. Since heat shield 12 forms an exterior of injector 10, heat shield 12 experiences a greater temperature increase relative to stem 16 and protected portions of nozzle 18. As such, the net thermal growth of stem 16 and nozzle 18 can be less than thermal growth of heat shield 12 causing axial gap G to decrease as described above. Under these conditions, radial gap R tends to increase as radial displacement of heat shield 12 tends to exceed radial displacement of nozzle 18 and stem 16, which are exposed to a lower temperature than heat shield 12 during operation.

Figure 3:
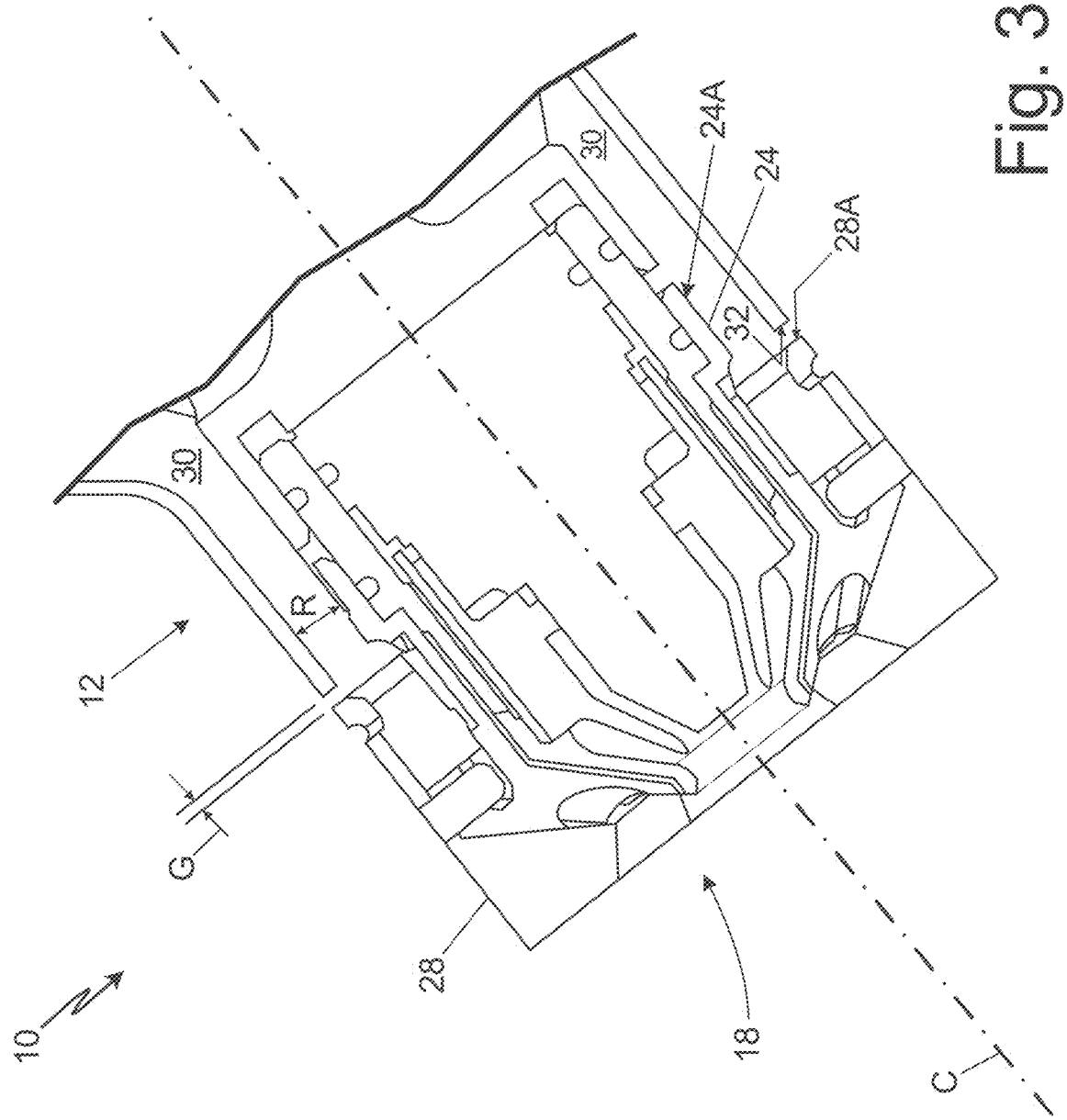
FIG. 3 is an enlarged cross-sectional view of the nozzle depicting an alternative configuration of the nozzle, the stem, and the heat shield.

FIG. 3 is a partial cross-sectional view of nozzle 18 that depicts features of an alternative embodiment of heat shield 12 and nozzle 18 in greater detail. Stem 16, nozzle 18, heat shield 12, axial gap G, and radial gap R are shown. Distal end 12A of heat shield 12 and nozzle 18 extend along axis C. Heat shield 12, nozzle 18, and cap 28 are analogous to corresponding components described in reference to FIG. 2 except axial gap A is formed between distal end 12A of heat shield 12 and inlet end 28A of cap 28 instead of lip 26 of exterior annular body 24. Radial gap R is defined by peripheral surface 24A of exterior annular body 24 and heat shield 12 in a similar manner to heat shield depicted by FIG. 2.

Axial gap G is the linear distance measured parallel to axis C between opposing points on inlet end 28A of cap 28 and end face 32 of heat shield 12. Radial gap R is the linear distance measured perpendicular to axis C between exterior peripheral surface 24A and an innermost point of end face 32.

Axial gap G has a magnitude equal to or greater than a calculated differential displacement of heat shield 12 relative to stem 16, nozzle 18, and cap 28, which can be calculated for a limiting operational condition of gas turbine engine, or for multiple operating conditions representing an operational range of gas turbine engine. In some examples, axial gap G is equal to or greater than threshold axial gap G. The threshold axial gap G exceeds the calculated differential displacement of heat shield 12 relative to stem 16, nozzle 18, and cap 28 by a predetermined amount such that axial gap G is non-zero at the limiting operational condition of gas turbine engine. In some examples, axial gap G in a cold condition can be equal to or less than 508 microns (i.e., about 0.020 inches). In other examples, axial gap G in a cold condition can be equal to or less than 254 microns (i.e., about 0.010 inches). In other examples, axial gap G could have a different magnitude. Axial gap G in the hot condition can be zero in certain examples so long as heat shield 12 does not impose significant mechanical loads into cap 28 and/or nozzle 18. However, in other examples, axial gap G is non-zero in the hot condition such that a minimal axial gap G can be maintained in a limiting operational condition of the engine. In some examples, axial gap G can be at least 127 microns (i.e., about 0.005 inches). In each case, axial gap G is reduced in the hot condition relative to the cold condition such that high temperature gas is discouraged from entering chamber 30.

Radial gap R has a magnitude selected to maintain a minimum radial gap between heat shield 12 and exterior peripheral surface 24A throughout an entire operational range of gas turbine engine as described in reference to FIG. 2.

In operation, exposure of high temperature combustion gas to injector 10 increases body temperatures of heat shield 12, exposed portions of cap 28, and to a lesser degree stem 16, mount 14, nozzle 18, and manifold 20. Since heat shield 12 forms an exterior of injector 10, heat shield 12 experiences a greater temperature increase relative to stem 16 and protected portions of nozzle 18. As such, the net thermal growth of stem 16, nozzle 18, and cap 28 at axial gap G can be less than thermal growth of heat shield 12 causing axial gap G to decrease as described above. Under these conditions, radial gap R tends to increase as radial displacement of heat shield 12 tends to exceed radial displacement of nozzle 18 and stem 16, which are exposed to a lower temperature than heat shield 12 during operation.

Discussion of Possible Embodiments

The following are non-exclusive descriptions of possible embodiments of the present invention.

An Injector and Heat Shield

An injector according to an example embodiment of this disclosure includes, among other possible things, a mount, a stem, a nozzle, and a heat shield. The stem extends from the mount and includes at least one fuel passage. The nozzle joins to the stem apart from the mount. The nozzle includes at least one fuel discharge passage, an exterior annular body, and a lip. The at least one fuel discharge passage fluidly communicates with the at least one fuel passage. The lip extends outward from the exterior annular body. The heat shield extends from the mount to surround the steam and at least a portion of the nozzle. The distal end of the heat shield is spaced from the lip to form an axial gap that is configured to decrease in a hot condition relative to a cold condition operatively associated with the injector.

The injector of the preceding paragraph can optionally include, additionally and/or alternatively, any one or more of the following features, configurations and/or additional components.

A further embodiment of the foregoing injector, wherein the axial gap can be non-zero in the hot condition.

A further embodiment of any of the foregoing injectors, wherein the lip can include a mating surface.

A further embodiment of any of the foregoing injectors, wherein the heat shield can include an end face.

A further embodiment of any of the foregoing injectors, wherein the end face can be opposite the mating surface to form the axial gap.

A further embodiment of any of the foregoing injectors, wherein the mating surface can be normal to the axis.

A further embodiment of any of the foregoing injectors, wherein the end face can be normal to the axis.

A further embodiment of any of the foregoing injectors, wherein the mating surface and the end face can have complimentary frustoconical shapes.

A further embodiment of any of the foregoing injectors, wherein the heat shield can cantilever from the mount to the distal end.

A further embodiment of any of the foregoing injectors, wherein the heat shield can be spaced from the stem and the nozzle to form a chamber.

A further embodiment of any of the foregoing injectors, wherein the distal end of the heat shield can be spaced from the exterior annular body to define a radial gap.

A further embodiment of any of the foregoing injectors, wherein the radial gap can be configured to increase in the hot condition relative to the cold condition.

A further embodiment of any of the foregoing injectors can further include cap outboard of the exterior annular body and the lip.

A further embodiment of any of the foregoing injectors can further include a cap outboard of the exterior annular body, the lip, and the heat shield.

A further embodiment of any of the foregoing injectors can further include an air passage formed between the cap and the lip.

A further embodiment of any of the foregoing injectors, wherein the air passage can extend through the exterior annular body forward of the heat shield.

A further embodiment of any of the foregoing injectors, wherein the axial gap can be equal to or less than 508 microns in the cold condition.

A further embodiment of any of the foregoing injectors, wherein the axial gap can be equal to or less than 254 microns in the cold condition.

A further embodiment of any of the foregoing injectors, wherein the axial gap can be at least 127 microns in the cold condition.

An Injector, Heat Shield, and Cap

An injector according to an example embodiment of this disclosure includes, among other possible things, a mount, a stem, a nozzle, a cap, and a heat shield. The stem extends from the mount and includes at least one fuel passage. The nozzle joins to the stem apart from the mount. The nozzle includes at least one fuel discharge passage and an exterior annular body. The cap is joined to the cap and extends towards the heat shield to at least partially overlapping the nozzle. The at least one fuel discharge passage fluidly communicates with the at least one fuel passage. The heat shield extends from the mount to surround the steam and at least a portion of the nozzle. The distal end of the heat shield is spaced from the cap to form an axial gap that is configured to decrease in a hot condition relative to a cold condition operatively associated with the injector.

The injector of the preceding paragraph can optionally include, additionally and/or alternatively, any one or more of the following features, configurations and/or additional components.

A further embodiment of the foregoing injector, wherein the axial gap can be non-zero in the hot condition.

A further embodiment of any of the foregoing injectors, wherein the cap can include an inlet end.

A further embodiment of any of the foregoing injectors, wherein the heat shield can include an end face.

A further embodiment of any of the foregoing injectors, wherein the end face can be opposite the inlet end to form the axial gap.

A further embodiment of any of the foregoing injectors, wherein the inlet end can be normal to the axis.

A further embodiment of any of the foregoing injectors, wherein the end face can be normal to the axis.

A further embodiment of any of the foregoing injectors, wherein the mating surface and the inlet end can have complimentary frustoconical shapes.

A further embodiment of any of the foregoing injectors, wherein the heat shield can cantilever from the mount to the distal end.

A further embodiment of any of the foregoing injectors, wherein the heat shield can be spaced from the stem and the nozzle to form a chamber.

A further embodiment of any of the foregoing injectors, wherein the distal end of the heat shield can be spaced from the exterior annular body to define a radial gap.

A further embodiment of any of the foregoing injectors, wherein the radial gap can be configured to increase in the hot condition relative to the cold condition.

A further embodiment of any of the foregoing injectors, wherein the cap can be outboard of the exterior annular body.

A further embodiment of any of the foregoing injectors can further include an air passage formed between the cap and the exterior annular body.

A further embodiment of any of the foregoing injectors, wherein the air passage can extend through the exterior annular body forward of the heat shield.

A further embodiment of any of the foregoing injectors, wherein the axial gap can be equal to or less than 508 microns in the cold condition.

A further embodiment of any of the foregoing injectors, wherein the axial gap can be equal to or less than 254 microns in the cold condition.

A further embodiment of any of the foregoing injectors, wherein the axial gap can be at least 127 microns in the cold condition.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An injector operatively associated with a hot condition and a cold condition, the injector comprising:
   a mount;
   a stem extending from the mount, wherein the stem includes at least one fuel passage;
   a nozzle joined to the stem apart from the mount that extends from the stem along an axis, the nozzle comprising:

at least one fuel discharge passage in fluid communication with the at least one fuel passage;
an exterior annular body; and
a lip extending outward from the exterior annular body to circumscribe the exterior annular body; and
a heat shield extending from the mount to surround the stem and at least a portion of the nozzle, wherein the heat shield is spaced from the stem and the portion of the nozzle to form a chamber therebetween, and wherein a distal end of the heat shield that is spaced from the lip to form an axial gap that is configured to decrease in the hot condition relative to the cold condition;
wherein the lip includes a mating surface that circumscribes the exterior annular body, and the heat shield includes an end face opposite the mating surface to form the axial gap.

2. The injector of claim 1, wherein the axial gap is non-zero in the hot condition.

3. The injector of claim 1, wherein the mating surface and the end face are normal to the axis.

4. The injector of claim 1, wherein the mating surface and the end face are complimentary frustoconical shapes.

5. The injector of claim 1, wherein the heat shield cantilevers from the mount to the distal end.

6. The injector of claim 1, wherein the heat shield is spaced from the stem and the nozzle to form a chamber.

7. The injector of claim 1, wherein the distal end of the heat shield is spaced from the exterior annular body to define a radial gap.

8. The injector of claim 7, wherein the radial gap is configured to increase in the hot condition relative to the cold condition.

9. The injector of claim 1, wherein the nozzle further comprising:
a cap outboard of the exterior annular body, the lip, and the heat shield; and
an air passage formed between the cap and the lip and extending through the exterior annular body forward of the heat shield.

10. An injector operatively associated with a hot condition and a cold condition, the injector comprising:
a mount;
a stem extending from the mount, wherein the stem includes at least one fuel passage;
a nozzle joined to the stem apart from the mount that extends from the stem along an axis, the nozzle comprising:
at least one fuel discharge passage in fluid communication with the at least one fuel passage;
an exterior annular body; and
a lip extending outward from the exterior annular body to circumscribe the exterior annular body; and
a heat shield extending from the mount to surround the stem and at least a portion of the nozzle, wherein a distal end of the heat shield that is spaced from the lip to form an axial gap that is configured to decrease in the hot condition relative to the cold condition, and wherein the axial gap is non-zero in the hot condition;
wherein the lip includes a mating surface that circumscribes the exterior annular body, and the heat shield includes an end face opposite the mating surface to form the axial gap.

11. The injector of claim 10, wherein the mating surface and the end face are normal to the axis.

12. The injector of claim 10, wherein the mating surface and the end face are complimentary frustoconical shapes.

13. The injector of claim 10, wherein the heat shield cantilevers from the mount to the distal end.

14. The injector of claim 10, wherein the heat shield is spaced from the stem and the nozzle to form a chamber.

15. The injector of claim 10, wherein the distal end of the heat shield is spaced from the exterior annular body to define a radial gap.

16. The injector of claim 15, wherein the radial gap is configured to increase in the hot condition relative to the cold condition.

17. The injector of claim 10, wherein the nozzle further comprising:
a cap outboard of the exterior annular body, the lip, and the heat shield; and
an air passage formed between the cap and the lip and extending through the exterior annular body forward of the heat shield.

18. An injector operatively associated with a hot condition and a cold condition, the injector comprising:
a mount;
a stem extending from the mount, wherein the stem includes at least one fuel passage;
a nozzle joined to the stem apart from the mount that extends from the stem along an axis, the nozzle comprising:
at least one fuel discharge passage in fluid communication with the at least one fuel passage;
an exterior annular body;
a lip extending outward from the exterior annular body to circumscribe the exterior annular body;
a cap outboard of the exterior annular body and the lip; and
an air passage formed between the cap and the lip and extending through the exterior annular body;
a heat shield cantilevered from the mount to surround the stem and at least a portion of the nozzle, wherein the heat shield is spaced from the stem and the portion of the nozzle to form a chamber therebetween, and wherein a distal end of the heat shield that is spaced from the lip to form an axial gap that is configured to decrease in the hot condition relative to the cold condition, and wherein the axial gap is non-zero in the hot condition, and wherein the air passage is unobstructed by the heat shield, and wherein the lip includes a mating surface that circumscribes the exterior annular body, and the heat shield includes an end face opposite the mating surface to form the axial gap.

* * * * *